United States Patent

[11] 3,526,178

[72] Inventor: Günter Fauth, Unterhaching, near Munich, Germany
[21] Appl. No.: 692,976
[22] Filed: Dec. 22, 1967
[45] Patented: Sept. 1, 1970
[73] Assignee: Agfa-Gevaert Aktiengesellschaft, Leverkusen, Germany
[32] Priority: Dec. 24, 1966
[33] Germany
[31] A 26,915

[54] CAMERA FOR DAYLIGHT AND FLASH PHOTOGRAPHY
13 Claims, 2 Drawing Figs.

[52] U.S. Cl. .................................................. 95/11.5, 95/55
[51] Int. Cl. .................................................. G03b 9/70
[50] Field of Search .................................................. 95/11.5, 55, 56

[56] References Cited
UNITED STATES PATENTS

| | | | |
|---|---|---|---|
| 2,859,674 | 11/1958 | Rentschler | 95/11.5 |
| 3,139,805 | 7/1964 | Peterson | 95/11.5 |
| 3,205,801 | 9/1965 | Peterson | 95/11.5 |
| 3,232,196 | 2/1966 | Sapp, Jr. et al. | 95/55X |
| 3,353,467 | 11/1967 | Ernisse et al. | 95/11.5 |

Primary Examiner—Norton Ansher
Assistant Examiner—Robert P. Greiner
Attorney—Michael S. Striker ABSTRACT: The synchronizing switch of a still camera comprises two torsion springs which can be flexed by an impeller of the shutter when the impeller travels under the bias of a spring to propel a shutter blade to open position. The impeller consists of current conducting material and temporarily engages both springs during travel from a starting position. The springs are installed in prestressed condition and bear permanently against two terminals which can be connected with complementary terminals of an illuminating arrangement when the latter is attached to the housing of the camera. The impeller also serves to prevent advance of the film by more than the length of a frame between successive exposures.

Patented Sept. 1, 1970
3,526,178
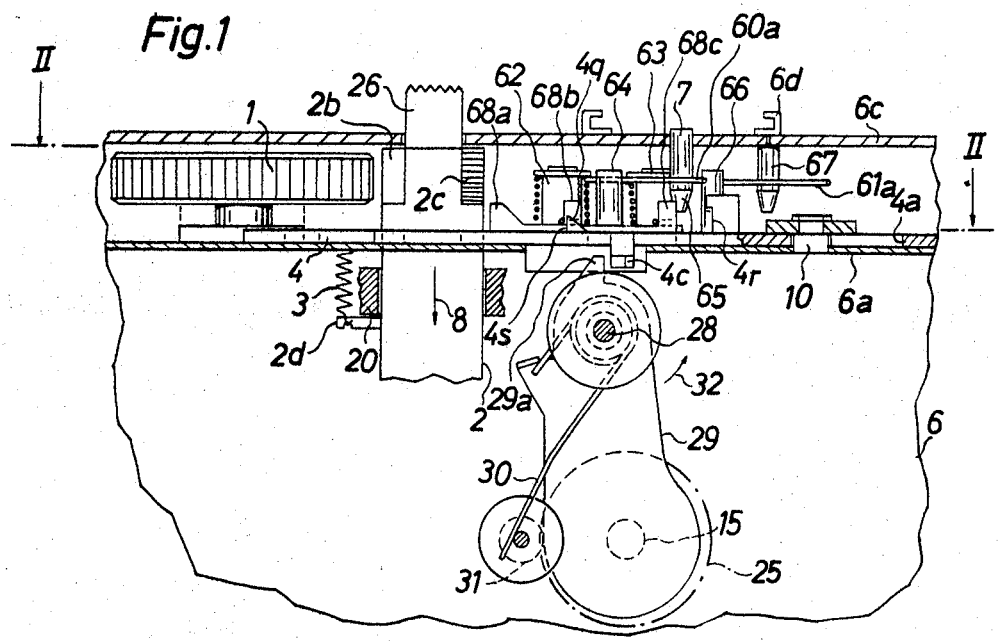
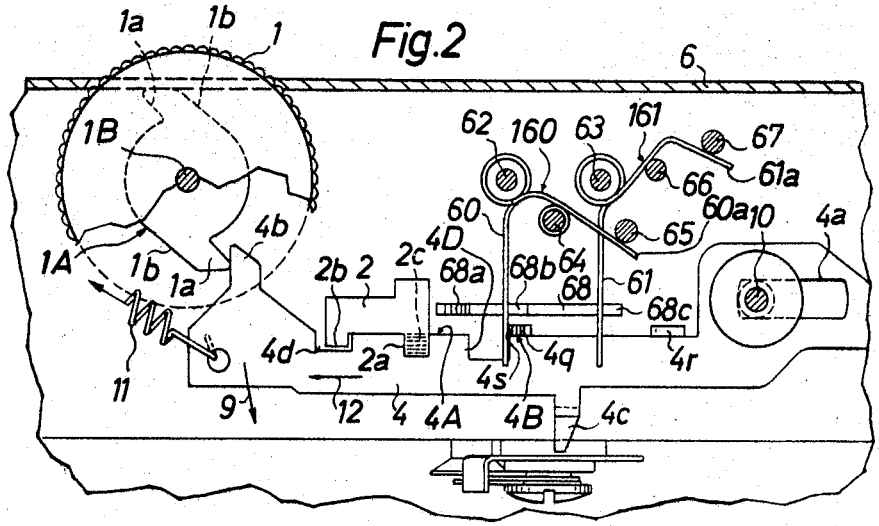
INVENTOR.
GÜNTER FAUTH

CAMERA FOR DAYLIGHT AND FLASH PHOTOGRAPHY

CROSS REFERENCE TO RELATED APPLICATIONS

The photographic camera of my present invention constitutes a further development of an improvement over cameras disclosed in copending application Ser. No. 633,146 (Fauth et al.) filed August 24, 1967.

BACKGROUND OF THE INVENTION

The present invention relates to photographic cameras for operation in daylight and/or with artificial illumination of the subject. More particularly, the invention relates to improvements in cameras wherein the shutter actuates the synchronizing switch to fire a flash bulb or to effect illumination of the subject by another source of artificial light.

My aforementioned copending applications disclose a double exposure preventing member which can close and open the synchronizing switch. The latter comprises a leaf spring which is engaged by a projection of the double exposure preventing member to thus complete the circuit of the illuminating arrangement. The bias and position of the leaf spring must be selected with a high degree of accuracy to insure that the synchronizing switch remains closed for a requisite period of time when the shutter is open and that the spring does not rebound in response to engagement by the double exposure preventing member. Closing and renewed opening of the synchronizing switch must take place while the double exposure preventing member travels from a starting position. Adjustments of the leaf spring are effected by bending and such bending normally takes place subsequent to complete assembly of the camera. The same holds true if the leaf spring is replaced by a torsion spring.

SUMMARY OF THE INVENTION

It is an object of my present invention to provide a photographic camera wherein the synchronizing switch is assembled, mounted and actuated in a novel and improved way.

Another object of the invention is to provide a camera wherein the synchronizing switch requires no adjustment once its contacts are installed in the housing of the camera and wherein the installation of synchronizing switch requires no soldering at all or a minimum of soldering and can be carried out without resorting to leads.

A further object of the invention is to provide a camera wherein the synchronizing switch can be actuated by that portion of the shutter which also performs one or more additional functions, such as preventing repeated exposure of the same film frame and/or preventing the transporting mechanism from advancing the film by more than the length of a single frame.

The improved camera comprises a shutter movable between open and closed positions and including a portion which moves in a predetermined direction with movement of one or more shutter blades to open position, release means operative to effect opening of the shutter, and a synchronizing switch having two contacts of elastomeric material. The aforementioned portion of the shutter establishes a current conducting connection between the two contacts to close the switch while it travels in the predetermined direction. Such portion may consist of current conducting material and may be provided with two projections, one for each of the contacts. At least one of the two projections is disengaged from the respective contact when the shutter is closed. The current conducting portion of the shutter preferably serves as a control means to prevent double exposure and to prevent transport of the film by more than the length of a single frame between successive operations of the release.

The novel features which are considered as characteristic of the invention are set forth in particular in the appended claims. The improved camera itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

FIG. 1 is a fragmentary longitudinal vertical sectional view of a still camera which embodies my invention; and FIG. 2 is a horizontal sectional view, substantially as seen in the direction of arrows from the line II—II of FIG. 1.

DESCRIPTION OF THE PREFERRED EMBODIMENT

The camera shown in FIGS. 1 and 2 comprises a housing 6 having an upper portion or top wall 6c which supports or is provided with an accessory shoe 6d for the foot of an illuminating arrangement, e.g., a customary flash unit having a first terminal adapted to engage the shoe 6d and a second or central terminal adapted to engage a pin-shaped terminal 7 located within the confines of the shoe and extending upwardly from the top wall 6c. Thus, that portion of the electric circuit which is installed in the illuminating arrangement is electrically connected with that portion of the circuit which is installed in the housing 6 when the foot of the illuminating arrangement is properly inserted into the shoe 6d. The parts 6d and 7 constitute the terminals of the last mentioned portion of this circuit. The front wall of the housing 6 carries a lens mount 25 located in front of an opening or aperture 15 which is normally covered by a shutter blade 29. The latter is turnable on a pivot pin 28 and is biased to closed position by a torsion spring 30 so as to bear against a stop 31. The blade 29 has a motion receiving projection 29a which normally extends into the path of movement of a motion transmitting projection or lug 4c provided on a reciprocable control member or impeller 4 consisting of current-conducting material and performing several functions including that of double exposure preventing means. The stop 31 is preferably adjustable for the purpose of changing the exposure time.

The shutter release 2 of the camera resembles a flat vertically reciprocable slide and has a knob 26 which extends through an opening in the top wall 6c and can be depressed by hand to effect movement of shutter blade 29 to open position. The slide 2 is biased to its upper end position by a return spring 3 which operates between the housing 6 and a stud 2d of the slide to maintain the stud 2d in abutment with a bearing 20. The direction in which the slide 2 must be depressed through the intermediary of the knob 26 to effect opening of the shutter is indicated by an arrow 8. The slide 2 further comprises two arms 2a, 2b the former of which is provided with an inclined cam face 2c.

The film transporting mechanism of the camera comprises a manually operated actuating wheel 1 connected with a shaft 1B and a gear train or the like including a sprocket (not shown) which can enter the perforations of film to advance the film lengthwise from a first chamber containing a supply cartridge, behind the opening 15, and toward a second chamber containing a takeup cartridge. The shaft 1B carries a disk-shaped cam 1A having two lobes or teeth 1a which can cooperate with a tooth-like portion 4b at the left-hand end of the control member 4. The latter is biased against the radial flank of the adjoining lobe 1a by a helical contraction spring 11 which tends to shift it in the direction indicated by arrow 12. The right-hand end portion of the control member 4 has an elongated slot 4a slidable along a guide pin 10 which is affixed to the housing 6. The control member 4 is installed in the space below the top wall 6c and its rear edge face 4A has a cutout or recess 4d which registers with the arm 2b of the slide 2 when the transport of film by the length of a frame is completed, i.e., when the surface bounding the left-hand end of the slot 4a bears against the guide pin 10 and prevents further rightward movement of the control member 4. The latter then assumes a starting position and prevents renewed actuation of the film transporting mechanism prior to depression of the knob 26 so that the user cannot transport two successive film frames without making an exposure subsequent to completed transport of the first frame.

The operation of the camera is as follows:

FIGS. 1 and 2 show the parts of the camera in positions which they assume when a fresh film frame is located behind the opening 15. The portion 4b of the control member 4 prevents further anticlockwise rotation of the cam 1A and shaft 1B because it bears against the adjoining lobe 1a of the cam. The arm 2b of the slide 2 registers with the recess 4d in the rear edge face 4A of the control member 4 and the projection 29a of the shutter blade 29 extends into the path of the projection 4c on the control member because the shutter blade bears against the stop 31. To make an exposure, the user depresses the knob 26 whereby the cam face 2c of the arm 2a on the slide 2 pivots the control member 4 about the axis of the guide pin 10 (arrow 9 in FIG. 2) so that the tooth-like portion 4b moves along the tip of the adjoining lobe 1a and ultimately bypasses the cam 1A so that the control member 4 can follow the bias of spring 11 and is propelled from starting position to travel in a direction to the left as indicated by the arrow 12. The mounting of spring 11 is such that it causes the inclined right-hand flank of the tooth-like portion 4b to slide along the face 1b of the cam 1A when the control member 4 travels in a direction to the left to the extent determined by the length of its slot 4a. During movement of control member 4 under the action of spring 11, the projection 4c strikes against the projection 29a and propels the shutter blade 29 in the direction indicated by arrow 32 whereby the blade moves to open position and permits scene light to pass through the opening 15 and to impinge against the foremost unexposed film frame. The spring 30 thereupon immediately returns the blade 29 into abutment with the stop 31 to close the shutter and to thus complete the exposure.

When the exposure is completed and the slide 2 has returned to its upper end position (abutment of stud 2d with the bearing 20), the user must operate the film transporting mechanism before the knob 26 can be depressed again. This is due to the fact that, when the tooth-like portion 4b of the control member 4 bears against the cam face 1b and the surface bounding the right-hand end of the slot 4a bears against the guide pin 10, the recess 4d in the rear edge face 4A of the control member 4 is out of registry with the arm 2b of the slide 2 so that the latter cannot move downwardly. In this way, the portion 4D of the control member 4 prevents repeated exposure of the same film frame to scene light. When the user thereupon turns the actuating wheel 1 in a sense to turn the cam 1A in a counterclockwise direction, as viewed in FIG. 2, the radial face of the other lobe 1a engages the tooth-like portion 4b and pushes the control member in a direction to the right to the extent determined by the length of the slot 4a by simultaneously causing the spring 11 to store energy. The wheel 1 places a fresh film frame into registry with the opening 15 when the guide pin 10 prevents further leftward movement of the control member 4 beyond starting position and the recess 4d then returns into registry with the arm 2b of the slide 2 so that the latter can be depressed through the intermediary of the knob 26 to effect a renewed opening of the shutter. The means for preventing clockwise rotation of the cam 1A under the bias of the spring 11 through the intermediary of the tooth-like portion 4b on the control member 4 when the latter assumes the starting position shown in FIGS. 1 and 2 preferably comprises a pawl which cooperates with a ratchet wheel (not shown) on the shaft 1B in a manner well known from the art. When the control member 4 moves back to the starting position shown in FIGS. 1 and 2, the spring 11 causes it to turn in a direction counter to that indicated by the arrow 9. During such return movement of the control member 4, its projection 4c can slide over the projection 29a of the shutter blade 29 because the projection 29a is preferably provided with a suitably inclined cam face shown in FIG. 1.

The shutter shown in FIGS. 1 and 2 is a simple impeller type shutter but it is clear that the control member or impeller 4 is equally capable of actuating or of forming part of a more sophisticated shutter with two or more blades. The spring 11 is strong enough to overcome the resistance of the spring 30 and to cause the projection 4c to propel the shutter blade 29 to open position when the cam 1A releases the control member 4 and permits the latter to travel in the direction indicated by arrow 12.

The synchronizing switch of the aforementioned electric circuit is installed in the housing 6 and serves to establish an electrical connection between the accessory shoe 6d and pin 7 when the shutter blade 29 assumes its open position. Such connection can be established through the intermediary of the control member 4 and two metallic torsion springs 160, 161. These springs are respectively coiled about fixed posts 62, 63 which consist at least in part of insulating material. Several convolutions of the springs 160, 161 are shown in FIG. 1. The arms or contacts 60a, 61a of the springs 160, 161 are respectively flexed by posts 64, 65 and 66, 67. The posts 64 and 66 consist of insulating material and are mounted on an internal partition 6a of the housing 6 below the top wall 6c. The posts 65, 67 consist of current-conducting material and are respectively connected to or integral with the central contact 7 and accessory shoe 6d. Thus, the springs 160, 161 are electrically connected with and respectively bear against the contact 7 and shoe 6d. The second contacts or arms 60, 61 of these springs extend toward and overlie the control member 4 in a manner as shown in FIG. 2. When in idle positions, the arms 60, 61 bear against two upwardly extending protuberances 68b, 68c of an insulating guide member 68 mounted on the partition 6a and extending in substantial parallelism with the control member 4. A disengaging cam 68a at the left-hand end of the guide member 68 has a cam face which is inclined upwardly and away from the protuberances 68b, 68c, and the top of this cam face extends to a level above the top of a similarly inclined cam face 4q on an entraining projection or tooth 4B provided on the control member 4 adjacent to its rear edge face 4A. The tooth 4B is further provided with a vertical or nearly vertical entraining face 4s which engages the tip of the contact or arm 60 when the control member 4 assumes the starting position shown in FIGS. 1 and 2. The contact or arm 61 then bears solely against the protuberance 68c but not against a second projection or tooth 4r of the control member 4. The springs 160, 161 are properly stressed during mounting in the housing 6 so that their stress need not be adjusted upon completed assembly of the camera. Soldering or the use of flexible leads is not necessary so that the assembly of that portion of the circuit which is installed in the housing 6 involves little work. The arms 60, 61 are stressed by the insulating guide member 68 when the control member 4 is held in the starting position shown in the drawing.

When the transport of film is completed so that an unexposed film frame registers with the opening 15, the parts of my camera assume the positions shown in the drawing. The synchronizing switch including the springs 160, 161 is open because the rear projection or tooth 4r of the current-conducting control member 4 is spaced from the arm 61 of the spring 161. However, the front projection or tooth 4B bears against the arm 60 of the spring 160. If the user decides to make an exposure, the knob 26 is depressed and the cam face 2c causes the tooth-like portion 4b to move away from the adjoining lobe 1a so that the spring 11 contracts and propels the control member 4 in the direction indicated by arrow 12. The front tooth 4B entrains the arm 60 of the spring 160 but the synchronizing switch closes only when the rear tooth 4r of the control member 4 reaches the arm 61 of the spring 161. The circuit is then completed through the tooth 4r, the body of control member 4, tooth 4B, spring 160, post 65 of terminal 7, a flash bulb or the like in the illuminating arrangement whose foot is inserted into the shoe 6d, shoe 6d and its post 67, and spring 161. Such closing of the synchronizing switch takes place when the shutter is open, i.e., when the blade 29 is propelled in the direction indicated by arrow 32 and permits the opening 15 to admit scene light to the unexposed film frame.

The synchronizing switch opens again shortly after the arm 60 of the spring 160 reaches the inclined face of the disengaging cam 68a on the insulating guide member 68. The inclined face of the cam 68a causes the tip of the arm 60 to slide upwardly to a level above the vertical face 4s of the front projection or tooth 4B so that the arm 60 is free to return to idle position in which it abuts against the protuberance 68b on the guide member 68. This takes place after the projection 4c moves beyond the projection 29a of the shutter blade 29, i.e., shortly before the blade returns to closed position. When the control member 4 moves in a direction to the right (under the action of the cam 1A when the latter rotates with the actuating wheel 1 of the film transporting mechanism), the inclined face 4q of the front tooth 4B temporarily lifts the tip of the arm 60 whereupon the latter returns to the position shown in FIG. 1. During such lifting, the rear tooth 4r is spaced from the arm 61 so that the synchronizing switch remains open.

The control member 4 can be said to constitute that movable portion of the shutter which establishes a current-conducting connection between the resilient elements 160, 161 of the synchronizing switch when it travels in one direction (arrow 12) in response to operation of the shutter release in a sense to effect opening of the shutter.

The distance between the disengaging cam 68a and the adjoining protuberance 68b is preferably selected in such a way that the synchronizing switch remains closed until the blade 29 begins to overlie the opening 15. During the initial stage of its movement from starting position, the control member 4 gathers momentum and closes the synchronizing switch (engagement of projection 4r with the contact 61) when or immediately after its projection 4c strikes against the projection 29a.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. In a photographic camera, a combination comprising shutter means movable between open and closed positions and including a portion consisting at least in part of current-conducting material and movable from a starting position during opening of said shutter means; release means operative to effect opening of said shutter means in starting position of said portion; film transporting means operative to advance the film and engaging said portion in said starting position, said portion preventing operation of said transporting means upon completed advance of the film by the length of a frame and being movable by said transporting means to starting position upon operation of said release means; and synchronizing switch means including a pair of contacts, said portion being arranged to establish a direct electrical connection between said contacts in response to movement from said starting position.

2. A combination as defined in claim 1, wherein said synchronizing switch means comprises two metallic springs and each of said contacts forms part of one of said springs.

3. A combination as defined in claim 1, wherein said portion of said shutter means is reciprocable to and from said starting position.

4. A combination as defined in claim 1, further comprising means for biasing said portion of said shutter means from said starting position.

5. A combination as defined in claim 1, wherein said shutter means further comprises blade means movable between open and closed positions and said portion of said shutter means is a spring-biased impeller which propels said blade means to open position in response to movement from said starting position so that the blade means assumes such open position when said switch means closes.

6. In a photographic camera for operation in daylight and/or artificial light, a combination comprising shutter means movable between open and closed positions and including a control member consisting of current conducting material and reciprocable in a predetermined direction to and from a starting position, said control member moving from said starting position during opening of said shutter means and including a pair of projections; release means operative to effect opening of said shutter means, said control member including a portion which prevents operation of said release means in other than said starting position; film transporting means operative to advance the film lengthwise, said control member engaging with said film transporting means in said starting position to prevent operation of said transporting means upon completed advance of the film by the length of a frame and being movable to starting position by said transporting means upon operation of said release means; and synchronizing switch means including a pair of current conducting contacts of elastomeric material, said control member being arranged to establish an electrical connection between said contacts in response to movement in said predetermined direction and each of said projections being arranged to engage one of said contacts in response to movement of said control member from starting position.

7. A combination as defined in claim 6, wherein one of said projections is spaced from the respective contact in the starting position of said control member.

8. A combination as defined in claim 7, further comprising guide means for locating said contacts in idle positions in the starting position of said control member and including means for disengaging one of said contacts from the respective projection after said control member covers a predetermined distance during movement from said starting position so that the respective contact is then free to return to idle position.

9. A combination as defined in claim 8, wherein said guide means consists of insulating material and said disengaging means comprises a cam having an inclined face along which said one contact travels during a portion of movement of said control member from starting position.

10. A combination as defined in claim 9, wherein said guide means comprises a pair of protuberances which maintain said contacts in idle positions, said contacts being prestressed so that each thereof tends to bear against the respective protuberance.

11. In a photographic camera for operation in daylight and/or artificial light, a combination comprising shutter means movable between open and closed positions and including a portion movable from a starting position in a predetermined direction during opening of said shutter means; release means operative to effect opening of said shutter means; synchronizing switch means including a pair of current conducting contacts of elastomeric material, said portion of said shutter means being arranged to establish an electrical connection between said contacts in response to movement in said predetermined direction; and a pair of terminals each in permanent current conducting engagement with one of said contacts, said contacts forming part of two prestressed metallic springs each of which bears against one of said terminals.

12. In a photographic camera for operation in daylight and/or artificial light, a combination comprising shutter means movable between open and closed positions and including a portion movable from a starting position in a predetermined direction during opening of the shutter means; release means operative to effect opening of said shutter means; synchronizing switch means including a pair of current conducting contacts of elastomeric material, said portion of said shutter means being arranged to establish an electrical connection between said contacts in response to movement in said predetermined direction; and a pair of terminals each in permanent current conducting engagement with one of said contacts, one of said terminals being an accessory shoe and the other terminal being a pin located within the confines of said shoe.

13. A combination as defined in claim 12, further comprising a housing accommodating said contacts and said shutter means, said housing having a top wall supporting said shoe and said pin.